United States Patent [19]

Yip et al.

[11] Patent Number: 4,686,542
[45] Date of Patent: Aug. 11, 1987

[54] HIGH SPEED, HIGH RESOLUTION RASTER OUTPUT SCANNER

[75] Inventors: Kwok-Leung Yip, Webster, N.Y.; Ronald L. Antos, Cincinnati, Ohio; Robert P. Herloski, Rochester, N.Y.

[73] Assignee: Xerox Corporation, Stamford, Conn.

[21] Appl. No.: 848,003

[22] Filed: Apr. 3, 1986

[51] Int. Cl.$^4$ .......................... G01D 9/42; H04N 1/21
[52] U.S. Cl. ..................................... 346/108; 358/296
[58] Field of Search ................. 346/108, 107 R, 76 L, 346/160; 358/296, 298, 300, 302

[56] References Cited

U.S. PATENT DOCUMENTS

| | | | |
|---|---|---|---|
| 3,449,051 | 6/1969 | Levitt | 356/130 |
| 3,534,166 | 10/1970 | Korpel | 178/6.7 |
| 4,019,186 | 4/1977 | Dressen et al. | 346/108 |
| 4,170,028 | 10/1979 | DeBenedictis et al. | 358/285 |
| 4,201,455 | 5/1980 | Vadasz et al. | 350/358 |
| 4,205,348 | 5/1980 | DeBenedictis et al. | 358/285 |
| 4,213,158 | 7/1980 | DeBenedictis | 358/296 |
| 4,314,261 | 2/1982 | Martinage | 346/108 |
| 4,357,627 | 11/1982 | Johnson | 358/348 |
| 4,404,571 | 9/1983 | Kitamura | 346/108 |
| 4,454,547 | 6/1984 | Yip et al. | 358/302 |
| 4,554,561 | 11/1985 | Daniele | 346/108 |

OTHER PUBLICATIONS

W. Campbell & R. Owen; "Beam Splitter Intensities Are Preselected"; Applied Optics; vol. 20, No. 21, 11/1/81.

G. Ammon & C. Reno; "Optics for Multibeam Optical Disk Systems (OMODS)", SPIE, vol. 299, Advances in Laser Scanning Technology, (1981), pp. 25-32.

*Primary Examiner*—E. A. Goldberg
*Assistant Examiner*—Mark Rewhart
*Attorney, Agent, or Firm*—Frederick E. McMullen

[57] ABSTRACT

A high speed, high resolution raster output scanner having a single source beam; a beam splitter for separating the beam into at least two separate and parallel writing beams; an acousto-optic modulator having a substrate sized to provide a separate modulating channel for each writing beam to pass through without intruding into the other modulating channels; an rf transducer for each writing beam for generating separate acoustic waves in each modulating channel of the substrate; a control circuit for simultaneously intensity modulating the writing beams by the rf output of all transducers in accordance with separate lines of image signals; and optical means for simultaneously projecting the intensity modulated writing beams at points two lines apart on a recording member, the optical means including a polygon for scanning the writing beams across the recording member so as to write plural image lines at once.

8 Claims, 5 Drawing Figures

HIGH SPEED, HIGH RESOLUTION RASTER OUTPUT SCANNER

The invention relates to raster output scanners, and more particularly, to high speed, high resolution multi-beam raster output scanners.

Raster output scanners create or write images in accordance with the image content of an image signal. Typical present day raster output scanners are xerographic based and the images are written on a photoreceptor. There, the moving photoreceptor, having been previously charged, is exposed line by line by a high intensity beam of electromagnetic radiation, such as a laser, that has been modulated in accordance with input image signal. The modulated beam is focused by suitable optical elements to a point on the photoreceptor and scanned across the photoreceptor by a scanning element such as a rotating multi-faceted polygon. As a result, latent electrostatic images representative of the input image signal are created on the photoreceptor and thereafter developed by the application of a suitable toner thereto. The developed images are then transferred to copy sheets and fixed to provide permanent copies.

As one looks to and envisions the future of raster output scanners, it seems clear that much higher copy output speeds will be needed along with better and higher image resolutions. Unfortunately, higher copy output speeds and high image resolutions tend to be antithesis of one another since achieving one is usually at the expense of the other. For example, higher image resolutions and some of the sophisticated processing that goes with it such as facet tracking, pulse imaging, etc., increases the amount of modulator bandwidth required. However, current day modulators have relatively limited operating bandwidth and this fact has led to the need to maintain copy processing speeds and hence copy output relatively low in order to achieve high image resolutions. For as can be understood, reducing copy processing speeds relaxes the bandwidth requirements of the modulator thereby enabling the higher image resolutions to be achieved with present day modulators. Conversely, if the number of pixels or spots per unit of length is reduced, copy processing speeds and hence copy output can be increased although here image resolution suffers.

One answer is of course to speed up the scanner and scan at faster speeds. However, it has been found, with the current state of technological development, that there exists a practical limit of approximately 40,000 rpm at which the scanning element such as a polygon can be rotated. Thus, with the maximum speed of the raster output scanner limited by the maximum speed at which the scanning element can be operated and with the bandwidth of present day modulators limited, future development of high speed high resolution raster output scanners is difficult.

The invention seeks to enable high speed, high resolution raster output scanners within the limits of current technology and component availability by providing a raster output scanner which simultaneously writes plural image lines from a like number of discrete streams of image signals on a light sensitive recording member thereby reducing by a factor equal to the number of lines the operating speeds imposed on the scanner components comprising: a source beam of radiant energy; means for separating the source beam into at least two parallel beams; and acousto-optic light intensity modulator in the path of the beams for modulating each of the beams separately, the modulator including an acousto-optic medium sized to provide a separate modulating channel for each beam without intruding into any other adjacent modulating channel, the separating means separating the beams from one another by a distance such that each beam impinges on a separate modulating channel of the medium, an ultrasonic transducer disposed in operative relation with each modulating channel of the medium for generating acoustic waves in each modulating channel, and control circuit means for intensity modulating the output of each transducer in accordance with a separate line of image signals; means for simultaneously projecting the beams through the medium modulating channels in a direction transverse to the direction of propagation of the acoustic waves to produce in the medium separate moving images of information corresponding to each of the lines of image signals; optical means for simultaneously projecting the output intensity modulated beams by the modulator onto the recording member at separate lines in a manner such that the velocity of the moving image lines are substantially equal to and in the opposite direction as the tangential component of motion of the information images; and pulse polarity reverse logic circuit means for reversing the voltage polarity of alternate pixels in each stream of image signals to thereby increase the image contrast of the intensity modulated beams at the recording member.

In the ensuing description, the fast scan direction refers to the direction in which the scanning beam is scanned across the recording member while the slow or cross scan direction refers to the direction of movement of the recording member which is typically at right angles to the fast scan direction.

Figure 1:
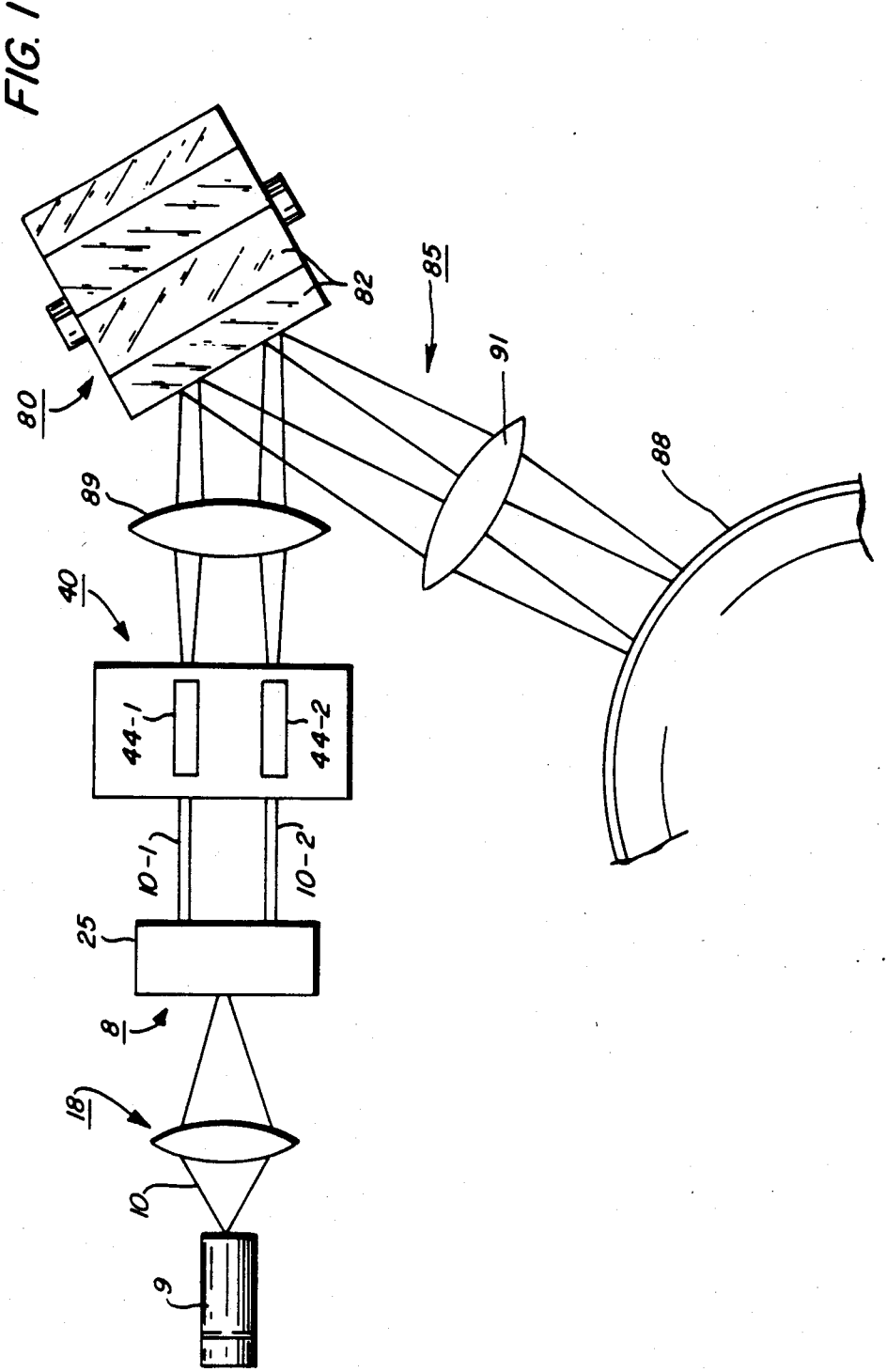
FIG. 1 is a schematic view of the high speed high resolution raster output scanner of the present invention.

Referring to FIG. 1, there is shown the multi-beam pulse imaging phase reversal facet tracking raster output scanner, designated generally by the numeral 8, of the present invention. Scanner 8 includes a suitable light source 9 for producing a beam 10 of high intensity light. Light source 9 comprises a gas laser such as a helium-cadmium or a helium-neon laser. A diode laser with appropriate optics may also be used. The beam 10 output by light source 9 passes through suitable pre-modulator optics 18 which provides the desired light beam shape at modulator 40. Beam 10 is shaped by pre-modulation optics 18 so as to have a generally elliptical cross section, the cross sectional width (w) of the beam in the fast scan direction being substantially larger than the cross sectional height (h) of the beam in the cross scan direction.

Following pre-modulator optics 18, beam 10 is input to beam splitter 25 which splits the beam 10 into a plurality of parallel beams. In the exemplary arrangement shown and described herein, beam 10 is split by beam splitter 25 into two beams, 10-1 and 10-2. However, as will appear more fully, beam splitter 25 may be designed to provide additional beams if desired. Beams 10-1 and 10-2 are separated from one another by a distance sufficient to prevent interference or crosstalk between the beams.

Figure 2:
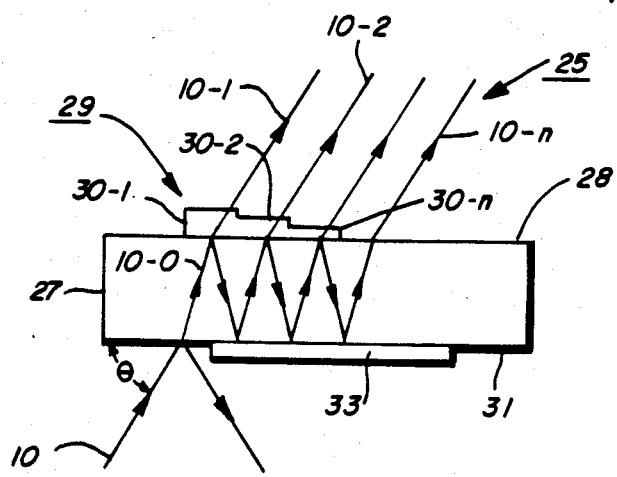
FIG. 2 is a view showing details of the beam splitter for the scanner shown in FIG. 1 for separating the source beam into a plurality of parallel imaging beams.

Referring particularly to FIG. 2, beam splitter 25 consists of a generally rectangular substrate 27 of suitable transparent material such as glass disposed astride the path of beam 10 at a predetermined angle of incidence $\theta$ thereto. The beam exit side 28 of substrate 27 has a partially relecting surface 29 thereon designed to reflect a part of beam 10 while transmitting the remainder. To provide multiple parallel output beams 10-1, 10-2, ... 10-n, the density of partially reflecting surface 29 is reduced in steps 30-1, 30-2, ... 30-n, each step 30-1, 30-2, ... 30-n providing less and less reflection. The size and location of the steps 30-1, 30-2, ... 30-n is selected to correspond with the path and angle of incidence $\theta$ of the beam components. A reflecting surface 33, disposed on the beam inlet side 31 of substrate 27 and offset relative to partial reflecting surface 29 so as to allow the source beam 10 to pass into substrate 27, reflects the partial beams reflected by surface 29 through substrate 27 toward side 28 of substrate 27 and partially reflecting surface 29.

In operation, beam 10 impinging on side 31 of substrate 27 passes through substrate 27 at an angle of incidence $\theta$ and strikes the first segment 30-1 of the partially reflecting surface 29 at side 28 of substrate 27. Surface 29 passes a portion of the beam 10 as beam 10-1 while the remainder of the beam is reflected back through substrate 27 to fully reflecting surface 33. Surface 33 reflects the beam back through substrate 27 and the reflected beam impinges on he second segment 30-2 of the partially reflecting surface 29. Segment 30-2 of partially reflecting surface 29 passes a portion of the beam 10-2 while the remainder of the beam is again reflected back through substrate 27 to impinge on reflecting surface 33. This process is repeated until the last beam portion reflected by the reflecting surface 33 impinges on side 28 of substrate 27 at a point that is past reflecting surface 29 so that the last beam portion exits substrate 27 as beam 10-n.

In the exemplary arrangement shown and described in FIGS. 1 and 3–5, only two beams 10-1 and 10-2 are employed and accordingly the partially reflecting surface 29 of beam splitter 25 consists of only a single segment 30-1 which reflects approximately 50% of the beam 10-0. The remaining 50% of the beam 10-0 exits through the partially reflecting surface 29 as beam 10-1. The remainder of the beam, is reflected by fully reflecting surface 33 and exits substrate 27 as beam 10-2.

Figure 3:
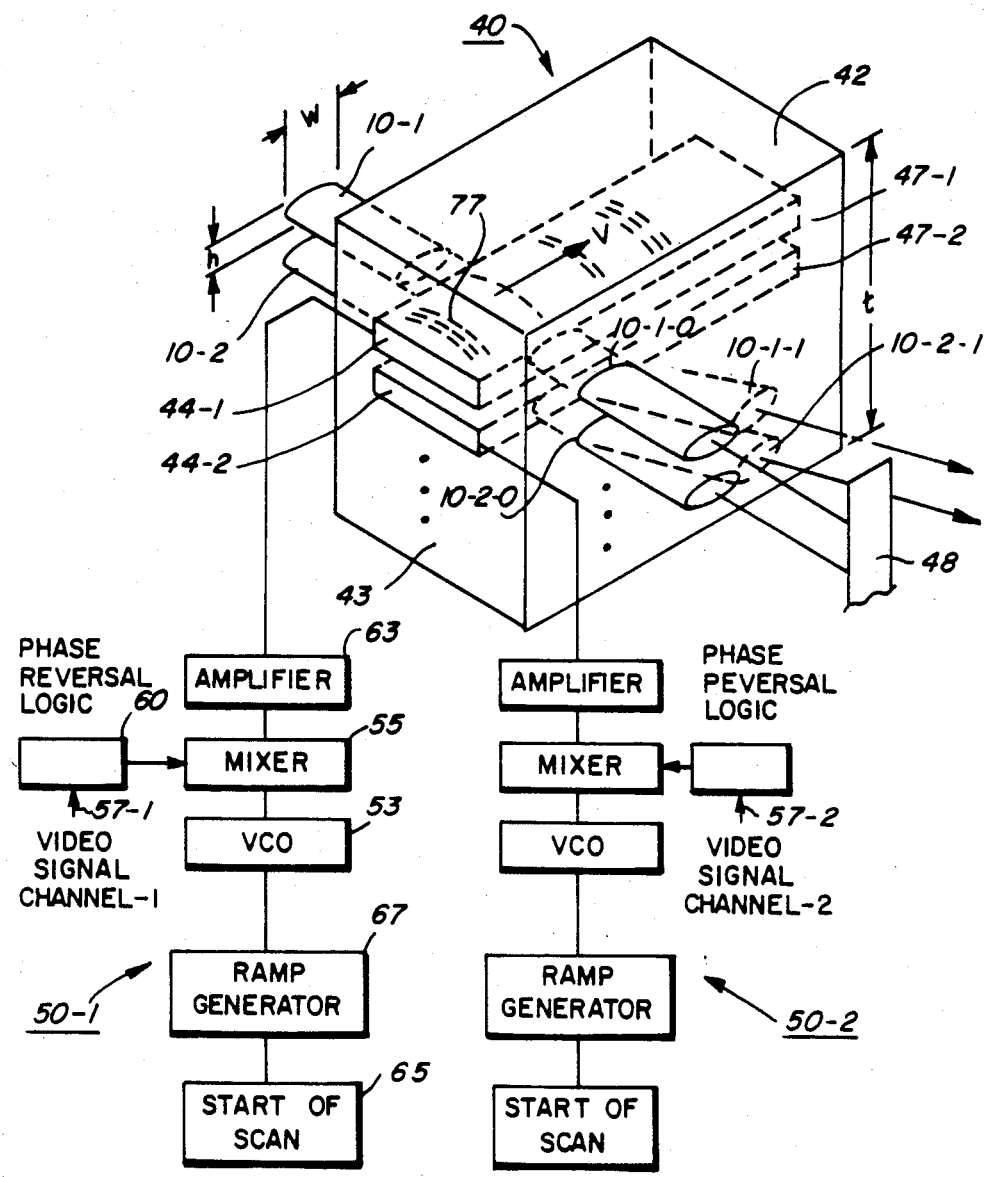
FIG. 3 is a partial isometric view showing details of the multiple channel modulator which separately modulates the output plural imaging beams by the beam splitter simultaneously together with circuits for supplying separate streams of image signals to each modulator channel.

Referring particularly to FIG. 3 of the drawings, modulator 40 has a suitable acousto-optical substrate 42 which may be glass, plastic, crystal, etc. The operating thickness (t) of modulator substrate 42 is sufficient to permit two separate, distinct, and non-overlapping modulating channels or sections 47-1, 47-2 to be created for beams 10-1 and 10-2 respectively. the center-to-center separation between channels 47-1, 47-2 is sufficient to prevent or at least minimize acoustic interference, such as crosstalk, between the neighboring acoustic channels 47-1, 47-2. A transducer 44-1, 44-2 is associated with each beam 10-1 and 10-2. Transducers 44-1, 44-2, which may for example comprise electrically driven piezoelectric elements, are provided on one side 43 of substrate 42 by suitable means, as for example by evaporation, substantially opposite the area where modulating channels 47-1, 47-2 are desired. transducers 44-1, 44-2, which are sized to provide optimum modulating performance, are positioned one above the other.

As will be understood, each transducer 44-1, 44-2, on application of an electrical drive signal, generates an acoustic wave which travels through the portion of the substrate 42 opposite the transducer and perturbs the index of refraction in the part of the substrate, the refractive index perturbation acting as a phase grating in which the grating period is equal to the drive or acoustic frequency. Grating density is proportional to the amplitude of the drive signal applied to transducers 44-1, 44-2, while the wavefronts are segmented by the video signal characteristics. For a video signal consisting of a stream of "1"s and "0"s, it is assumed that the spacing between segmented wavefronts is determined by the "0" time of the video signal. Alternately, the "1" time may be used instead.

The incoming beams 10-1 and 10-2 are focused to the desired spot size at modulator 40 entering or intersecting the modulating channels 47-1, 47-2 respectively and are placed at a proper distance from the transducer surface such that each beam entering substrate 42 of modulator 40 passes through a region in which each acoustic wave is distinct. Each beam 10-1 and 10-2 entering modulator 40 interacts with the acoustic wave generated by the transducer 44-1 or 44-2 for that beam and is modulated by the input video signals to the transducer. For each beam 10-1 and 10-2, the beam size in the cross scan direction must be small enough to fit in the sound field of the modulator defined by the acoustic channels 47-1, 47-2. In the fast scan direction, the beam should be large enough to illuminate as many video bits as possible for image quality, but as few as possible to avoid or reduce velocity mismatch tolerance. Typically the beam size in the fast scan direction is about six to nine times the acoustic pulse width in the modulator.

The acousto-optic interaction is in the form of Bragg diffraction and where no signal is applied to the transducers 44-1, 44-2, only a nondiffracted output or zero order beam 10-1-0 or 10-2-0 is emitted by modulator 40. Application of a signal to the transducers 44-1, 44-2 produces first order diffracted beams 10-1-1 or 10-2-1 which are used to write images. The zero-order beams 10-1-0, 10-2-0 are absorbed by a beam stop 48. As will be understood, the intensity of the beams is a function of the amplitude of the drive signal applied to transducers 44-1, 44-2 with the angle $\phi$ representing the approximate angle of diffraction existing between the first-order and zero-order beams. Angle $\phi$ is directly proportional to the driving (rf) frequency f, the wavelength of the incident light, and inversely proportional to the velocity of propagation V of the acoustic pulses in the modulator substrate 42.

It is understood that the dimensions and particularly the thickness t of the modulator substrate 42, the number of transducers 44 used, and the number of beams 10-1, 10-2, ... 10-n that are to be modulated corresponds to the number of image signal channels which in turn controls the number of image lines to be written with each scan.

Each transducer 44-1, 44-2 has a driver 50-1, 50-2 respectively. Each driver 50-1, 50-2 has a Voltage Controlled Oscillator (VCO) 53 for generating high frequency rf signals, the output of VC 53 being fed to one input of a suitable mixer 55 for mixing the rf signal output of VCO 53 with the incoming video image signals. As will be understood, the video image signals may be derived from any suitable source such as a memory, communication channel, raster input scanner, etc. The video image signals are input through channels 57-1, 57-2 to a second input of mixer 55.

To accomplish facet tracking, a ramp generator 67 is connected to the VCO 53 for each transducer to vary the rf frequency linearly with time. The change of rf frequency will deflect the laser beam to follow the facet as the polygon 80 rotates.

A phase reverser 60 is provided in the video image signal channels 57-1, 57-2. Phase reverser 60, which comprises any suitable logic, reverses the polarity of successive or alternate video image signals thereby introducing a subharmonic component into the spatial frequency spectrum of the video signals at the facets 82 of the scanning polygon 80. This causes the scanning polygon facets, which act as a bandpass filter, to hold more image content that would otherwise be the case and increases the contrast ratio of the off and on/off images thereby improving the scan uniformity both in spot size and intensity. Concurrently, spot size asymmetry between the "on" and "off" pixels of the on/off images is reduced.

The output of mixer 55 is amplified by a suitable signal amplifier 63, the amplified output of each driver 50-1, 50-2 being coupled to the drive terminals of transducers 44-1, 44-2 respectively. Startup of drivers 50-1, 50-2 and the input of video image signals is controlled by a Start Of Scan (SOS) signal 65. SOS signal 65 may be produced for example by placing a suitable photosensor in the scanning path of beams 10-1, 10-2 and using the output signal of the photosensor as a reference to identify the starting point at which writing of the image lines commences. The SOS signal 65 is input through a ramp generator 67 to the control gate of VCO 53, ramp generator 67 serving to vary the rf signal output of VCO 53 with time. This provides controlled deflection of beams 10-1, 10-2 and causes the beams 10-1, 10-2 to follow or track on the polygon facets 82 as polygon 80 rotates.

Alternately, the End Of Scan (EOS) signal may be used either individually or in combination with SOS signal 65 to identify the starting point for writing the image lines.

Referring again to FIG. 1, imaging optics 85 are used to image the modulated light beams 10-1-1 and 10-2-1 from modulator 40 onto a recording medium such as photoreceptor 88 of a xerographic system in the scan direction. Imaging optics 85 includes an anamorphic lens 89 for focusing the first order beams 10-1-1 and 10-2-1 onto the facets 82 of a rotating scanning polygon 80 located at the Fourier transform plane of lens 89 and an anamorphic imaging lens 91 for imaging the reflected beams onto photoreceptor 88. As will be understood, modulator 40 and photoreceptor 88 are in optical conjugate planes with polygon 80.

Other scanning elements such as a holographic disc or hologon, etc., may be used in place of polygon 80 as will be understood.

In the cross scan direction, modulator 40 is optically coupled to polygon 80 and polygon 80 is imaged onto photoreceptor 88 with beams 10-1-1, 10-2-1 focused to the desired spot size on photoreceptor 88.

To provide pulse imaging scanning in the fast scan direction, the acoustic velocity ($V_a$) of the sound wave 77 in modulator 40 must be matched with the scan velocity ($V_{scan}$) of the beams 10-1-1 and 10-2-1 at photoreceptor 88 if image smearing is to be avoided. In this context, scan velocity ($V_{scan}$) may be defined in accordance with the following relationship:

$$V_{scan} = -MV_a,$$

where M is the magnification factor of the scanner. M in this case can be expressed as the ratio between the effective focal length ($F_2$) of the post modulator optics 89 and the effective focal length ($F_3$) of the post polygon optics 91 as:

$$M = F_3/F_2$$

Figure 4:
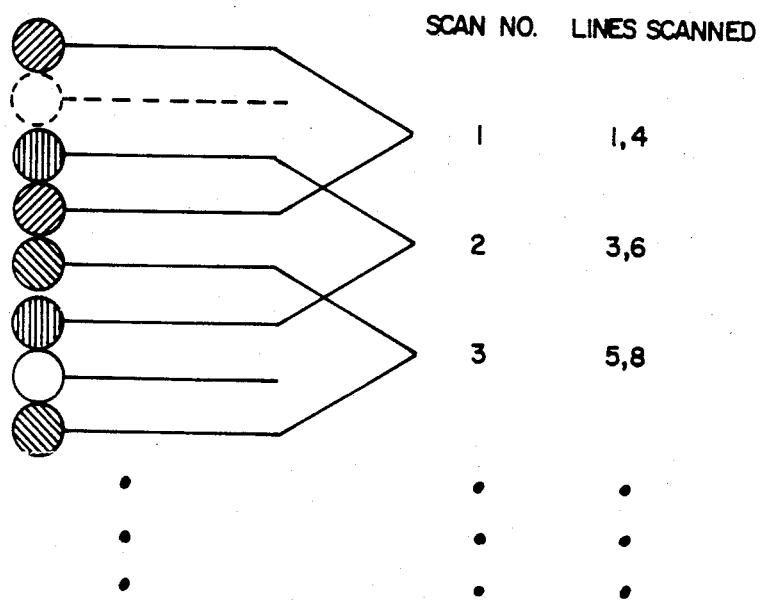
FIG. 4 is a chart illustrating the scanning sequence for the raster output scanner shown in FIG. 1.

As described, beams 10-1-1 and 10-2-1 are separated by an amount sufficient to avoid or at least minimize optical and acoustic interference effects. In the example shown, this results in a separation at photoreceptor 88 of two image lines as shown in FIG. 4. There, as can be seen, on the first scan, beam 10-1-1 exposes or writes image line 1 while beam 10-2-1 writes image line 4. On the second scan, beam 10-1-1 writes image line 3 while beam 10-2-1 writes image line 6, skipping lines 2 and 5. On the third scan, beam 10-1-1 writes image line 5 while beam 10-2-1 writes image line 8, and so forth and so on.

Figure 5:
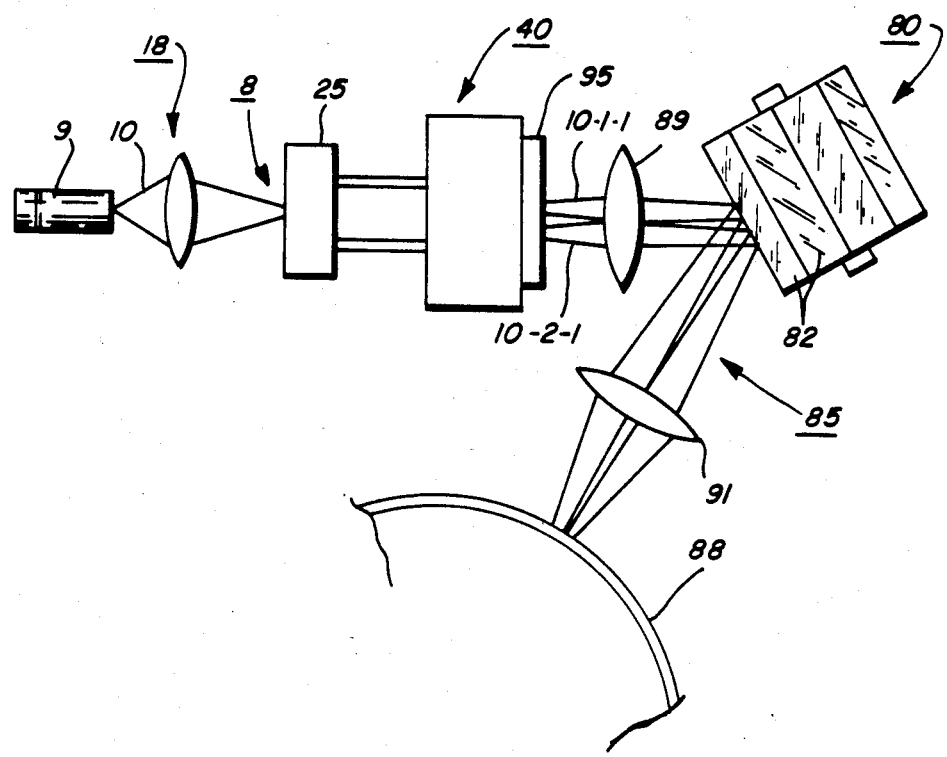
FIG. 5 is an alternate embodiment of the raster output scanner shown in FIG. 1 in which a beam combiner is provided for bringing the plural separated imaging beams into adjoining relationship with one another.

In the embodiment shown in FIG. 5, where like numbers refer to like parts, a beam combiner 95 is placed between modulator 40 and polygon 80, beam combiner 95 serving to bring the separated beams 10-1-1 and 10-2-1 into adjacent line by line proximity at photoreceptor 88. In that arragement, beams 10-1-1 and 10-2-1 write adjacent image line pairs with each scan, that is, on the first scan, beams 10-1-1 and 10-2-1 write image lines 1 and 2, on the second scan image lines 3 and 4, on the third scan image lines 5 and 6, etc. In this arrangement, photoreceptor 88 would advance or move two lines in the slow or cross scan direction for each scan.

While the invention has been described with reference to the structure disclosed, it is not confined to the details set forth, but is intended to cover such modifications or changes as may come within the scope of the following claims.

What is claimed is:

1. A raster output scanner capable of high speed, high resolution writing of images in response to image signals on a recording member, comprising in combination:
   (a) a source beam;
   (b) means for separating said source beam into at least two parallel beams;
   (c) an acousto-optical light intensity modulator for modulating each of said beams separately, said modulator including an acousto-optic medium sized to provide a separate modulating channel for each of said beams without intruding into adjoining modulator channels, said separating means separating said beams by an amount such that each beam impinges on a separate modulating channel, a separately controllable ultrasonic transducer for each of said beams disposed in operative relation with each of said modulating channels for generating acoustic waves in each of said modulating channels, and control circuit means for intensity modulating the acoustic waves output by each of said transducers in accordance with separate lines of image signals;

(d) means for simultaneously projecting said beams through said modulating channels in a direction transverse to the direction of propagation of said acoustic waves to produce separate moving images of information corresponding to each of said image signal lines;

(e) optical means for simultaneously projecting and scanning said intensity modulated beams onto said recording member at spaced points in a manner such that the velocity of said moving images are substantially equal to and in the opposite direction as the beams are scanned; and (f) pulse polarity reverse logic circuit means for reversing the voltage polarity of alternate bits in each of said image signals in each of said lines to thereby increase the image contrast of the intensity-modulated beams at said recording member.

2. The scanner according to claim 1 in which said beam separating means separates said beams by at least two image lines.

3. The scanner according to claim 2 including:
means to recombine said beams following modulation by said modulator so that said beams simultaneously write adjoining image lines on said recording member with each scan.

4. An optical data recording system for the simultaneous high optical resolution recording of plural image lines from a like number of discrete video bit streams on a moving light sensitive member comprising:

(a) means for providing a beam of radiant energy;
(b) means for separating said beam into at least two parallel image writing beams;
(c) an acousto-optical light intensity modulator in the path of said writing beams for modulating each of said writing beams separately to provide plural discrete information channels, said modulator including an acousto-optic medium, said writing beams being impinged on said medium at different points so that said writing beams pass through separate non-overlapping areas of said medium, a separately controllable ultrasonic transducer for each of said writing beams disposed in operative relation with said medium for generating acoustic waves confined to said medium separate areas, and control circuit means for intensity modulating the acoustic waves output by each of said transducers separately in accordance with said video bit streams;
(d) means for projecting said writing beams through said medium in a direction transverse to the direction of propagation of said acoustic waves to produce in said medium separate moving images of information corresponding to each of said video bit streams;
(e) optical means interposed in the path of the intensity modulated beams output by said modulators for simultaneously projecting said image lines onto discrete areas of said member, said optical means including a scanning element for simultaneously scanning said writing beams across said light sensitive member whereby the velocity of said moving images are substantially equal to and in the opposite direction as the tangential component of motion of said writing beams, said scanning element scanning said writing beams across said light sensitive member in a direction substantially perpendicular to the direction of movement of said light sensitive member; and
(f) pulse polarity reverse logic circuit means for reversing the voltage polarity of alternate bits in each of said video bit streams to thereby increase the resolution of the intensity-modulated writing beams as recorded on said light sensitive member.

5. The system according to claim 4 in which said beam separating means comprises:

(a) a light transmissive substrate disposed astride the path of said beam, said substrate being disposed at an angle with respect to the optical axis of said beam;
(b) a linear array of partially reflecting surfaces on the beam exit side of said substrate, the degree of reflectivity of said partially reflecting surfaces progressively decreasing in steps, the number of said partially reflecting surfaces being one less than the number of said writing beams; and
(c) a substantially completely reflecting surface on the beam entrance side of said substrate whereby each beam portion reflected from said partially reflecting surfaces are in turn reflected by said completely reflecting surface to impinge on the next succeeding one of said partially reflecting surfaces whereby to provide said parallel writing beams.

6. The system according to claim 4 in which each of said control circuit means includes:

(a) a source of high frequency signals;
(b) means for mixing the output of said reverse logic circuit means with the output of said high frequency signal source to provide a high frequency signal input modulated by said video bit stream for driving the transducer associated therewith; and
(c) means for applying said signal input to said transducer.

7. The system according to claim 4 including
pre-modulator optical means between said beam source and said modulator for transforming said beam cross section to an ellipse, said beam being oriented so that the widest dimension of said ellipse parallels the direction of scanning of said writing beams by said scanning element.

8. The system according to claim 7 in which the widest dimension of said beam is at least sufficient to expose two pixels.

* * * * *